E. T. GRIFFITH.
SECTIONAL CUSHION TIRE.
APPLICATION FILED FEB. 3, 1916.
1,241,845.
Patented Oct. 2, 1917.
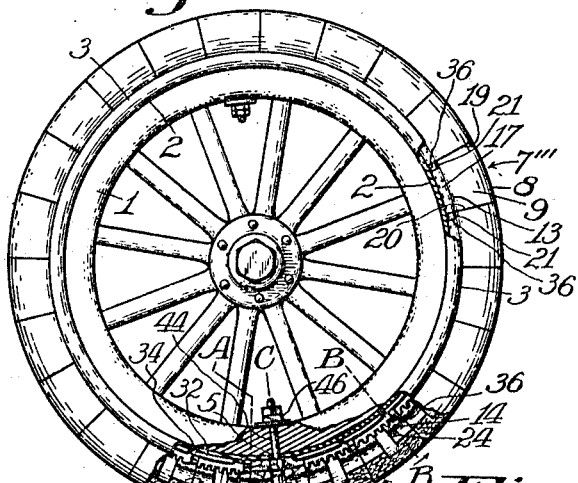
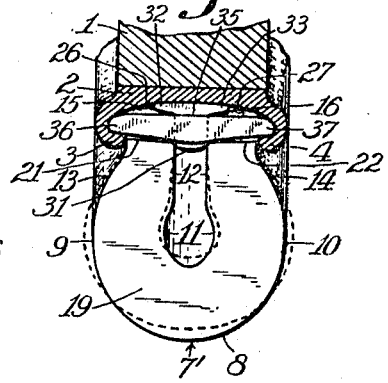
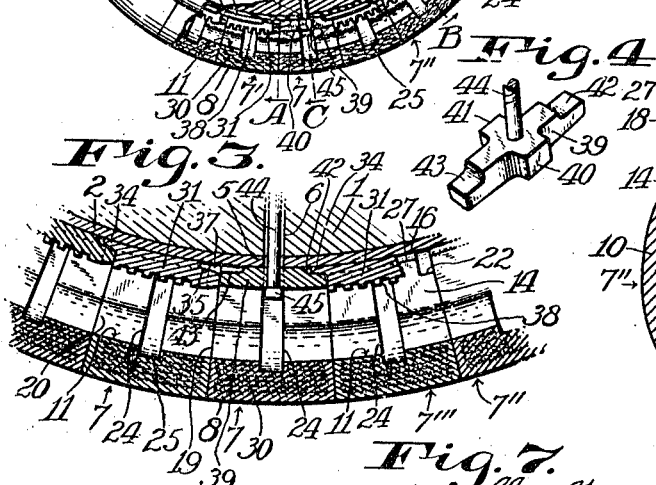
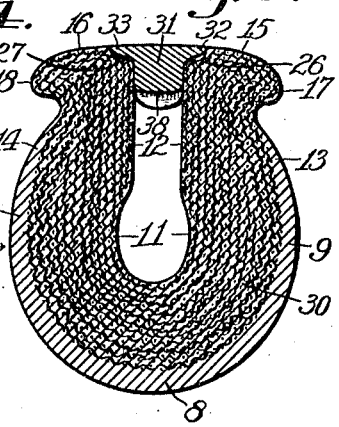
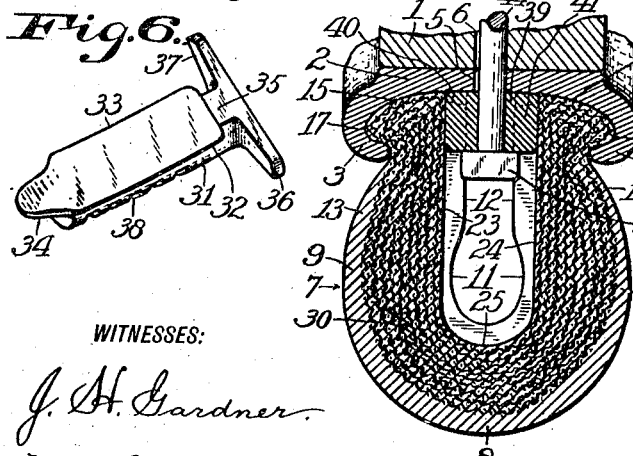
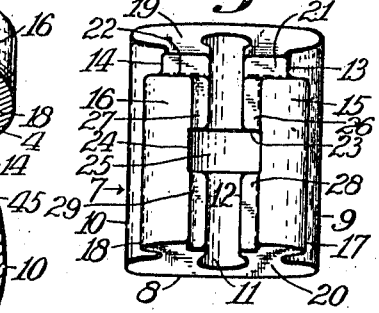
WITNESSES:
J. H. Gardner.
M. E. Sparrow.
INVENTOR:
Edward T. Griffith;
BY
E. T. Silvius.
ATTORNEY.

UNITED STATES PATENT OFFICE.

EDWARD T. GRIFFITH, OF INDIANAPOLIS, INDIANA.

SECTIONAL CUSHION-TIRE.

1,241,845.   Specification of Letters Patent.   Patented Oct. 2, 1917.

Application filed February 3, 1916. Serial No. 76,048.

*To all whom it may concern:*

Be it known that I, EDWARD T. GRIFFITH, a citizen of the United States, residing at Indianapolis, in the county of Marion and State of Indiana, have invented a new and useful Sectional Cushion-Tire, of which the following is a specification, reference being had to the accompanying drawings and to the letters and figures of reference marked thereon.

This invention relates to tires for vehicle wheels, and especially those of motor-driven vehicles, such as automobiles, trucks and motorcycles, the invention having reference more particularly to the type of cushion tire that is mainly composed of rubber or rubber composition and flexible fabric.

An object of the invention is to provide a cushion tire for wheels that shall approximate the well-known pneumatic tire in yielding and elastic quality, but without the disadvantages of the pneumatic tire.

Another object is to provide a highly resilient cushion tire of such construction as to permit it to be manufactured inexpensively and to be repaired at relatively small cost when required as a consequence of long wear in use, or deterioration due to great age of the tire.

Another object is to provide a cushion tire of such construction as to permit of its being easily applied to or removed from a wheel without requiring special tools or appliances in performing the operations, more especially of the clencher type of tire.

A further object is to provide a sectional cushion tire that shall be so constructed as to have great tractive force, not liable to become heated, and permit of ready repairs in case of an accident entailing the disqualifying of a portion of the tire for further use, an aim being to avoid the expense and trouble incident to the carrying of a spare tire on a vehicle for emergency use.

A still further object is to provide a hollow cushion tire of such construction as to afford a high degree of resiliency and not subject the user to the danger, delay, and trouble consequent on punctures or blowouts of pneumatic or inflated tires, an aim being to provide a cushion tire that shall be reliable at all times, durable, and economical in use.

With the above-mentioned and other objects in view, the invention consists in a sectional cushion tire having novel features of construction, and novel means whereby the sections of the tire are secured to a wheel-rim, the invention consisting further in the novel parts, and combinations and arrangements of parts, as hereinafter particularly described and further defined in the accompanying claims.

Referring to the drawings, Figure 1 is a front view of a vehicle wheel provided with the improved tire which is partially in section; Fig. 2 is a transverse section of the tire on the plane of the line A A on Fig. 1, showing an end elevation of one of the sections of the tire; Fig. 3 is a fragmentary central section of the tire longitudinally thereof; Fig. 4 is a perspective view of a key for locking the sections of the tire to its rim; Fig. 5 is a transverse section of the tire on the plane of the line B B on Fig. 1; Fig. 6 is a perspective view of a key for locking a tire section to its rim; Fig. 7 is a transverse section of the tire on the plane of the line C C on Fig. 1; and, Fig. 8 is a plan view of the inner side of the novel tire section.

Similar reference characters on the different figures of the drawings indicate corresponding elements or features of construction herein referred to.

In the drawings an automobile wheel is shown which includes a felly 1 and a rim 2, the invention however having no reference to the particular construction of the wheel, which in some cases may be devoid of the felly, but the improved tire may be connected with various types of wheel rims designed to have a clencher tire secured thereon, each rim 2 being provided with flanges 3 and 4 on opposite edges of the rim, the edges of the flanges being turned inward each toward the other. The rim commonly has an aperture 5 and the felly an aperture 6 to receive a tire-inflating tube, and in the present case the aperture is conveniently made use of for another purpose, as will be further explained.

The improved tire is composed of a suitable number of hollow sections 7, 7′, 7″, 7‴, all being identically alike so as to be interchangeable, the sections being of proper length, depending upon the diameter of the wheel rim, to collectively extend about the rim and form a substantially continuous tire.

Each tire section is formed as a segment of the circle and in cross-section may vary in contour, external contour preferably being similar to that of the well-known tire casing, so that the section has a peripheral or tread portion 8 from which extend two side portions 9 and 10 that constitute the main or body portion of the section and in which is a longitudinal opening 11 from which a relatively narrower opening or slot 12 extends to the inner side of the section, the slot dividing the inner portion of the section so that two base portions 13 and 14 are formed that have faces 15 and 16 respectively which are curved or shaped to correspond to the periphery of the rim 2, the base portions having external clencher ribs 17 and 18 that correspond to the inner sides of the flanges 3 and 4 respectively of the rim 2 which retain the section on the rim. Each section has relatively inclined ends 19 and 20 corresponding to radial planes so that the sections shall fit closely together. In order to obviate the necessity of providing a removable flange or ring 3 or 4 for the rim the slot 12 is sufficiently wide to permit either of the base portions of the section to be swung over to the other to release its clencher rib from the flange of the rim, or to permit the rib to be sprung in behind the lip of the flange. One end portion of each tire section has recesses 21 and 22 that extend in from the end 19 and from the bearing faces 15 and 16 respectively. The middle portion of each section has grooves 23 and 24 in the inner side of the base portions 13 and 14 respectively, the grooves extending from the bearing faces 15 and 16 in the sides of the slot 12 and the sides of the opening 11 to a recess 25 that extends from the opening 11 toward the periphery of the section to temporarily receive lugs of a securing key, which will be further explained. The base portions have also recesses 26 and 27 on one side and similar recesses 28 and 29 on the opposite side of the grooves, the recesses extending from the bearing faces of the base portions and from the sides of the slot 12, to receive portions of the locking-key of the sections. Each section is composed of rubber or rubber composition and fabric layers 30 embedded therein to insure the requisite stability of the section.

For the purpose of securing the sections of the tire to the wheel rim a suitable number of keys are provided, all identically alike, each key comprising a main bar 31 of proper width to permit it to be driven longitudinally into the slot 12 to force the base portions 13 and 14 apart, the bar being adapted to fit against the periphery of the rim 2 and being provided with longitudinally extending lateral wings 32 and 33 that extend into the recesses at the sides of the slot, the wings reinforcing the base portions and assisting in spreading them, one end of the bar having a projection 34 thereon designed to fit into a recess 35 of an adjacent key, the opposite end of each key having the recess, said opposite end being provided also with laterally extending lugs 36 and 37 that are received into the recesses 21 and 22 respectively and extend behind the lips of the flanges 3 and 4 of the wheel rim to retain one end portion of the key in position against the wheel rim, the opposite end of the key being retained by means of the projection 34 extending under the end of the adjacent key that is similarly provided with the lugs; thus the keys are prevented from being forced through the action of centrifugal force outward in the slots 12 toward the opening 11. The opposite or front face of the bar 31 has notches 38 therein into which an instrument may be inserted for withdrawing the bar longitudinally from the slot 12 in order to release a section from the wheel rim.

Preferably a different locking-key is provided for one or more of the sections in order to more positively prevent the sections from creeping longitudinally or circumferentially on the rim, and it comprises a bar 39 of proper size to fit closely in the slot 12 and force the ribs 17 and 18 against the flanges 3 and 4. The bar 39 has lateral lugs 40 and 41 thereon that extend into the grooves 23 and 24 respectively when assembled with the tire section. The bar is designed to rest against the periphery of the rim 2 and it has recesses 42 and 43 in its end portions adjacent to the rim, one of the recesses receiving the projection 34 of an adjacent key when the parts are assembled, the other recess being provided only for the purpose of permitting the key to be reversible. The middle portion of the key is provided with a bolt 44 which preferably extends through the key and has a head 45 thereon that can be received in the recess 25 when the key is pushed out of the slot 12 into the opening 11, the bolt being of suitable length to extend through the aperture 5 and also through the aperture 6 if the rim is secured to a felly, the bolt being provided with nuts 46 for drawing the key to the wheel rim and tightly securing it.

It should be understood that various modifications in the details are contemplated, as for instance some of the sections may be devoid of the grooves 23 and 24 although preferably each section is provided with them in order that the sections shall be interchangeable, and in some cases each section may be provided with either the key 39 or the key bar 31.

In order to assemble the sections on the wheel rim each section is sprung into place on the rim, after which the key bar 31 is driven into place, being guided to the rim by the wings 32 and 33 following the placing of the section, the lugs 36 and 37 having been first brought under the lips of the rim flanges while the key bar is free to be turned so as to bring the lugs into place. After all the sections are assembled excepting one or more that are intended to receive the key 39, the key 39 is placed in the slot 12 and forced up into the opening 11 which permits the base portions 13 and 14 to be forced together while the ribs 17 and 18 are sprung into place, after which the bolt 44 is engaged and forcibly drawn so as to pull the key back in the slot 12 until the key is seated against the wheel rim, the bolt then being secured by the nuts 46. All the keys being retained close to the wheel rim, they are in proper position to force the base portions of the sections apart and prevent the clencher ribs 17 and 18 from being withdrawn from the flanges of the wheel rim.

In practical use the weight on the tire causes the under portion of the tire to yield and be forced inward so that the side portions 9 and 10 are forced slightly outward, as are also the next adjacent portions of the base portions 13 and 14, so that the tire assumes the shape approximately as indicated by broken lines on Fig. 2. When the tire passes over an obstruction, such as a stone in the roadway, the yielding may be slightly greater, the relative proportions of the various portions of the tire and the opening 11 being so designed as to afford a high degree of cushion effect and resiliency, the proportions being dependent or determined on with respect to the amount of load to be carried by the tire.

Having thus described the invention, what is claimed as new is—

1. A cushion tire including segmental sections to be arranged on a circle, each section having a longitudinal slot in its inner side and a recess on each side of the slot extending outwardly from the slot toward the outside of the section, and a key bar to be longitudinally driven into the slot and having longitudinally-extending lateral wings to slide in the recesses for guiding the key bar along the inner side of the section.

2. A cushion tire including segmental sections to be arranged in a circle, each section having a longitudinal slot in its inner side and a transverse recess on each side of the slot and extending from one end of the section, the opposite outer sides of the section having each a longitudinal retaining-rib thereon, and a key to be longitudinally driven into the slot and having two lateral lugs on one end thereof to be received into the recesses respectively, each lug being adapted to extend outward co-extensive with the adjacent retaining-rib.

3. A cushion tire including segmental sections to be arranged in a circle, each section having a longitudinal slot in its inner side, the opposite outer sides of the section having each a longitudinal retaining-rib thereon, and key bars to be longitudinally driven into the slots to spread the retaining-ribs apart, each key bar having a projection extending from the inner side of one end thereof, the inner side of the opposite end portion of the key bar having a recess to receive the projection of an adjacent key bar, and devices for longitudinally guiding the key bar along the inner side of the section.

4. A cushion tire including segmental sections to be arranged in a circle, each section having a longitudinal slot in its inner side and a recess on each side of the slot and extending from the slot outwardly toward the outside of the section, the opposite outer sides of the section having each a longitudinal retaining-rib thereon, and key bars to be longitudinally driven into the slots, one in each slot, to spread the retaining-ribs apart, each key bar having longitudinally-extending lateral wings on its opposite sides adjacent to its inner side to slide in the recesses for guiding the key bar along the inner side of the section, the outer side of each key bar having notches therein extending transversely of the bar.

5. A cushion tire including segmental sections to be arranged in a circle, each section having an opening extending longitudinally through the section and a slot extending from the opening to the inner side of the section, the opposite outer sides of the section having each a longitudinal retaining-rib thereon, one of the sections having a recess therein extending from the opening toward the outer or peripheral portion of the section, the section having also a groove in each side of the slot extending from the inner side of the section to the recess, a key bar in the slot and having a lug on each of the two opposite sides thereof and extending into the adjacent one of the grooves to be moved therein, a bolt extending through the key bar and having a head seated on the outer side of the bar to be moved into the recess, and a key for each of the remaining sections.

6. A cushion tire including elastic segmental sections having each a longitudinal slot in the inner portion thereof and having also two recesses in the inner portion thereof, one in each of the two opposite sides of the slot, the opposite outer sides of the section having each a longitudinal retaining-rib thereon, and a key insertible in the slot for spreading the retaining-ribs apart between the flanges of a clencher-rim, the key having two longitudinally-extending lateral wings thereon to be entered and forced in the two recesses respectively for spreading the bases of the retaining-ribs.

7. A cushion tire including segmental elastic sections having each a longitudinal slot in the inner portion thereof and having also two radial grooves therein, one in each of the two opposite sides of the slot, the grooves being midway between the ends of the section and extending from the inner side toward the outer side of the section, the opposite outer sides of the section having each a longitudinal retaining rib thereon for engaging the flanges of a clencher-rim, and a key insertible in the slot and having two lugs thereon, one on each of the two opposite sides thereof, to enter the two grooves respectively, the key being adapted to hold the retaining-ribs in connection with the flanges, the lugs preventing longitudinal movement of the section on the clencher-rim, and a bolt connected to the key for securing the key to the clencher-rim.

8. In a sectional cushion tire, the combination with a wheel-rim having two flanges thereon, of elastic segmental sections arranged on the wheel-rim, the opposite sides of each section having a rib in engagement with the next adjacent flange, each section having a longitudinal slot therein extending from the inner side of the section, and a separate key for each section inserted in the slot thereof and having end portions coöperating with the adjacent end portions of adjacent keys to maintain the keys in alinement, one of the keys being locked to one of the sections to prevent relative longitudinal movement, the remaining keys being longitudinally movable in the slots of the segments.

9. In a sectional cushion tire, the combination of a plurality of elastic segmental sections to form a circle, each section having an opening extending longitudinally through the section and also a relatively narrow slot extending from the opening to the inner side of the section, the section having also a groove in each side of the slot extending from the inner side of the section and to the side wall of the longitudinal opening, and a key for each section inserted in the slot thereof, a number of the keys comprising each a bar movable in the slot of the section and having a lug on each of the two opposite sides thereof and extending into the adjacent one of the grooves to be moved therein, each bar having a securing bolt connected thereto and extending transversely from the bar and beyond the inner side of the section.

10. In a sectional cushion tire, the combination with a wheel-rim having two flanges thereon, of elastic segmental sections arranged on the wheel-rim, the opposite sides of each section having a rib in engagement with the next adjacent flange, each section having a longitudinal slot therein extending from the inner side of the section, and a key for each section arranged in the slot thereof to be longitudinally moved therein, one end portion of each key having a projection thereon, the opposite end portion of each key having two lateral lugs thereon, a lug on each of the two opposite sides of the key and extending to the adjacent one of the flanges, said opposite portion having also a recess receiving the projection of an adjacent key.

11. In a sectional cushion tire, the combination with a wheel-rim having two flanges thereon, each flange extending over toward the other to form a lip, of elastic segmental sections arranged end to end about the wheel-rim, each section having a slot therein extending from the inner side toward the peripheral portion thereof to form two base portions, the base portions having each a rib thereon extending behind the lip of the adjacent flange, each base portion having a longitudinal recess in its inner portion and having also a transverse recess extending from the slot in one end of the section, and keys in the slots and holding the base portions apart with the ribs in contact with the flanges of the wheel-rim, each key having lateral wings seated in the longitudinal recesses respectively and having also lateral lugs extending into the transverse recesses, the lugs extending also behind the respective flange lips, one end of each key having a projection thereon and the opposite end having a recess therein, the projection of one key extending into the recess of the next adjacent key.

12. In a sectional cushion tire, the combination with a wheel-rim having two flanges thereon and an aperture between the flanges, each flange extending over toward the other to form a lip, of elastic segmental sections arranged end to end about the wheel rim, each section having an opening extending longitudinally therethrough and also a slot extending from the opening to the inner side of the section to form two base portions that are seated on the wheel-rim, the outer side of each base portion having a rib thereon that extends behind the lip of the adjacent flange, the inner side of each base portion having a radial groove in the side of said slot, a main locking-key in the slot of one of the sections holding the base portions apart with the ribs in contact with the adjacent flanges, the locking-key having two lateral lugs thereon extending into the respective grooves and having also a recess in each end thereof, a bolt connected to the locking-key and extending through the aperture of the wheel-rim, a securing-nut on the bolt, and individual keys in the slots of the remaining sections respectively and retained therein, each individual key having a projection on one end and also a recess in the opposite end thereof receiving the projection of the next adjacent key, the projection of the key that is adjacent to the main locking-key extending into the recess of the adjacent end of the latter.

In testimony whereof, I affix my signature in presence of two witnesses.

EDWARD T. GRIFFITH.

Witnesses:
T. T. SILVIUS,
M. E. SPARROW.

Copies of this patent may be obtained for five cents each, by addressing the "Commissioner of Patents, Washington, D. C."